United States Patent
Schönhoff et al.

(10) Patent No.: US 12,146,544 B2
(45) Date of Patent: Nov. 19, 2024

(54) SYSTEM CONSISTING OF A FLEXIBLE OUTER BEARING SLEEVE OF AN ELASTOMER BEARING AND A BEARING TUBE

(71) Applicant: VOLKSWAGEN AKTIENGESELLSCHAFT, Wolfsburg (DE)

(72) Inventors: Nico Schönhoff, Braunschweig (DE); Jana-Maria Harke, Braunschweig (DE); Carsten Ziwica, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 5 days.

(21) Appl. No.: 17/511,630

(22) Filed: Oct. 27, 2021

(65) Prior Publication Data

US 2022/0154770 A1    May 19, 2022

(30) Foreign Application Priority Data

Nov. 13, 2020 (DE) ...................... 10 2020 214 302.1

(51) Int. Cl.
| | | |
|---|---|---|
| F16C 33/20 | (2006.01) | |
| F16F 1/38 | (2006.01) | |
| F16F 15/04 | (2006.01) | |
| F16C 17/02 | (2006.01) | |

(52) U.S. Cl.
CPC .......... *F16F 1/3835* (2013.01); *F16F 1/3842* (2013.01); *F16F 1/3863* (2013.01); *F16F 15/04* (2013.01)

(58) Field of Classification Search
CPC .............................. F16F 1/3835; F16F 1/3863
See application file for complete search history.

(56) References Cited

U.S. PATENT DOCUMENTS

| 7,234,693 B2 | 6/2007 | Schnaars et al. | |
|---|---|---|---|
| 2020/0124088 A1* | 4/2020 | Firszt | F16F 1/3835 |

FOREIGN PATENT DOCUMENTS

| DE | 3108701 A1 | 9/1982 | |
|---|---|---|---|
| DE | 102004019917 A1 | 11/2005 | |
| DE | 102009034337 A1 * | 1/2011 | F16F 1/3849 |
| DE | 102011001235 A1 | 9/2012 | |
| DE | 102011080452 A1 | 2/2013 | |
| DE | 102014217839 A1 | 3/2016 | |
| DE | 102017111668 A1 | 11/2018 | |
| DE | 102018121452 A1 | 3/2020 | |

(Continued)

*Primary Examiner* — Melody M Burch
(74) *Attorney, Agent, or Firm* — Barnes & Thornburg LLP

(57) ABSTRACT

A system of a flexible outer bearing sleeve of an elastomer bearing and a bearing tube, wherein the outer bearing sleeve and the bearing tube are specified so that the outer bearing sleeve is press-fitted in the bearing tube along a press-fitting direction to establish a form-fitting interconnection between the outer bearing sleeve and the bearing tube, wherein the outer bearing sleeve has an external profile having outward-projecting shoulders and introduction ramps running inward in the press-fitting direction, and wherein the bearing tube for the form-fitting interconnection between the outer bearing sleeve and the bearing tube has an internal profile communicating form-fittingly with the external profile of the outer bearing sleeve.

8 Claims, 3 Drawing Sheets

(56) References Cited

FOREIGN PATENT DOCUMENTS

| | | | |
|---|---|---|---|
| DE | 102018123055 A1 | 3/2020 | |
| DE | 102019113847 B3 * | 3/2020 | ............. F16C 17/10 |
| EP | 2456995 A1 | 5/2012 | |
| FR | 2292153 A1 | 6/1976 | |
| JP | H08233008 A | 9/1996 | |
| WO | WO-9533934 A1 * | 12/1995 | ............ F16C 27/063 |

\* cited by examiner

SYSTEM CONSISTING OF A FLEXIBLE OUTER BEARING SLEEVE OF AN ELASTOMER BEARING AND A BEARING TUBE

PRIORITY CLAIM

This patent application claims priority to German Patent Application No. 10 2020 214 302.1, filed 13 Nov. 2020, the disclosure of which is incorporated herein by reference in its entirety.

SUMMARY

Illustrative embodiments relate to a system of a flexible outer bearing sleeve of an elastomer bearing and a bearing tube, to a form-fitting interconnection of the outer bearing sleeve and the bearing tube, as well as to a transportation vehicle having the form-fitting interconnection.

BRIEF DESCRIPTION OF THE DRAWINGS

Disclosed embodiments are explained in more detail below with reference to the drawings, in which.

DETAILED DESCRIPTION

Figure 1:
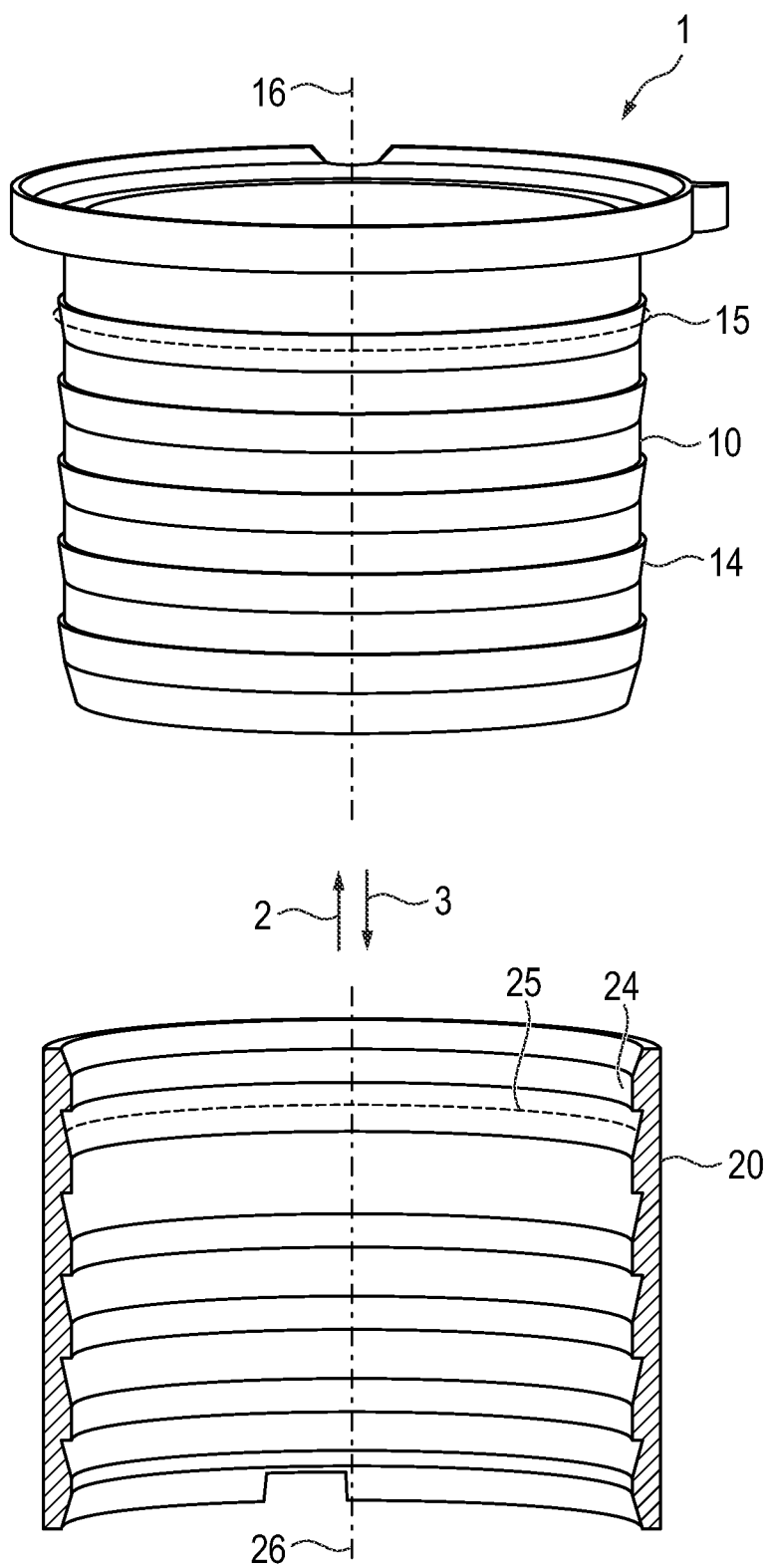
FIG. 1 shows a schematic view of a system according to an exemplary embodiment.

Elastomer bearings serve for connecting two functional groups to one another so as to absorb vibrations, shocks and noises, for example, or so as to prevent the transmission of such vibrations, shocks or noises from one functional group to the other. Elastomer bearings are used in the automotive sector, for example.

The requirements set for elastomer bearings in the automotive sector have sharply risen by virtue of electrification. Specifically, the extraction force which is to be applied and which represents a measure for a firm fit of an elastomer bearing in the bearing tube has increased. In comparison to the past, the desired extraction force for many applications, such as the mounting of electric motors on sub-frames of transportation vehicles, for example, can no longer be implemented just with the aid of an overlap of the outer bearing sleeve of an elastomer bearing with the bearing tube.

An interconnection of an elastomer bearing and a sleeve that covers the circular-cylindrical outer shell of elastomer of the elastomer bearing is known from EP 2 456 995 B1. A plurality of elastic embossed features that project inward and are uniformly distributed across the circumference of the sleeve are incorporated in the wall of the hollow-cylindrical sleeve. The elastic embossed features, when viewed in the direction of the press-fitting procedure of the elastomer bearing in the sleeve, form funnel-shaped constrictions of the available cross section of the sleeve. When press-fitting the elastomer bearing in the sleeve, the outer shell, while being elastically deformed, slides across bevels of the elastic embossed features, the latter likewise elastically deforming herein, to a terminal position in which the outer shell is latched in the sleeve.

The solution with the elastic embossed features, which may also be referred to as latching cams, is unfavorable to the extent that interconnection of the elastomer bearing and the bearing tube is associated with high complexity in terms of production. The bearing tube having the elastic embossed features, or latching cams, thereof, respectively, can thus be produced only with great complexity, and the joining of the elastomer bearing and the bearing tube is likewise complex. Furthermore, the interconnection is neither rotatable nor symmetrical, this being associated with limitations in terms of the assembling of the interconnection, in particular in terms of a combination capability, attachment points on the bearing tube, for example, for weld seams, and the positioning of a clinch seam.

Disclosed embodiments provide a system of a flexible outer bearing sleeve of an elastomer bearing and a bearing tube, the system not having the shortcomings of the prior art, in particular being able to be easily produced and assembled.

This is achieved by a system of a flexible outer bearing sleeve of an elastomer bearing and a bearing tube, by a form-fitting interconnection of an outer bearing sleeve of an elastomer bearing and a bearing tube, and by a transportation vehicle. Here, features and details which are described in the context of the disclosed system of course also apply in the context of the disclosed form-fitting interconnection and the disclosed transportation vehicle and in each case vice versa such that reference in terms of the disclosure pertaining to the individual embodiments is, or can be, at all times reciprocated.

A first disclosed embodiment provides a system of a flexible outer bearing sleeve of an elastomer bearing and a bearing tube. The outer bearing sleeve and the bearing tube are specified so that the outer bearing sleeve is press-fitted in the bearing tube along a press-fitting direction so as to establish a form-fitting interconnection between the outer bearing sleeve and the bearing tube. The outer bearing sleeve here has an external profile having outward-projecting shoulders and introduction ramps running inward in the press-fitting direction. The bearing tube for the form-fitting interconnection between the outer bearing sleeve and the bearing tube has an internal profile communicating in a form-fitting manner with the external profile of the outer bearing sleeve. At least the internal profile of the bearing tube is configured so as to be rigid such that the external profile of the outer bearing sleeve can deform when press-fitting the outer bearing sleeve in the bearing tube, and the internal profile of the bearing tube cannot deform when press-fitting the outer bearing sleeve in the bearing tube.

As opposed to the prior art, no flexible latching cams are provided in the disclosed embodiments. Provided instead is a rigid internal profile which cannot be elastically or plastically deformed when press-fitting the flexible outer bearing sleeve.

Rigid in the context of the disclosure and in terms of the bearing tube thus means that the bearing tube when press-fitting the outer bearing sleeve, or the elastomer bearing conjointly with the outer bearing sleeve, respectively, cannot elastically or plastically deform. Flexible in the context of the disclosure and in terms of the outer bearing sleeve however means that the outer bearing sleeve when press-fitting in the bearing tube can elastically deform. As the outer bearing sleeve is thus flexible, it is only the outer bearing sleeve that can be deformed for the purpose of press-fitting the outer bearing sleeve in the bearing tube.

The contour that forms the external shell face of the outer bearing sleeve and is provided for the form-fit with the internal profile is understood to be the external profile here.

The external profile thus comprises all elements such as shoulders and introduction ramps which, conjointly with corresponding mating elements of the internal profile, configure the form-fit. The internal profile likewise comprises these mating elements and is understood to be the contour that forms the internal shell face of the bearing tube and is provided for the form-fit with the external profile.

The bearing tube having the rigid internal profile is able to be manufactured in a substantially simpler and more cost-effective manner, this in turn providing a more cost-effective system of a flexible outer bearing sleeve and a bearing tube. Because of the external profile of the outer bearing sleeve having the introduction ramps, the press-fitting of the outer bearing sleeve in the bearing tube here can take place with a minor effort in terms of force, or with a low press-fitting force, respectively, while a very high extraction force is required for the disassembling of the interconnection thus produced, so that a particularly firm fit of the elastomer bearing in the bearing tube is provided.

It can be provided that the shoulders and/or the introduction ramps running in the press-fitting direction run along 20% to 100%, in particular 40% to 100%, and most particularly 80% to 100%, of an external circumference of the outer bearing sleeve. In other words, the shoulders and/or the introduction ramps can be configured having a circumference in the range of 20% to 100%, in particular in the range of 40% to 100%, and most particularly in the range of 80% to 100%, of the entire external circumference of the outer bearing sleeve. The shoulders and/or the introduction ramps can thus be configured so as to run partially along the external circumference of the outer bearing sleeve, having no interruption or one or a plurality of interruptions therebetween, or so as to run completely or continuously, respectively, along the external circumference of the outer bearing sleeve. This not only permits a higher extraction force as a consequence of the larger area for the form-fit between the outer bearing sleeve and the bearing tube, but also a symmetrical external profile of the outer bearing sleeve, or of the elastomer bearing overall, respectively, that is thus simple to manufacture and connect to the bearing tube.

It can furthermore be provided that the internal profile has mating shoulders that communicate in a form-fitting manner with the shoulders, and mating introduction ramps that communicate in a form-fitting manner with the introduction ramps and run in the press-fitting direction. The form-fitting communication method or mechanism that the respective elements of the profiles, thus shoulders and mating shoulders as well as introduction ramps and mating introduction ramps, in the connected state of the outer bearing sleeve and the bearing tube configure a form-fit. A robust form-fit, like meshing of respective elements of the two profiles, can be provided as a result.

It can be provided here that the mating shoulders and/or the mating introduction ramps running in the press-fitting direction run along 20% to 100%, in particular 40% to 100%, and most particularly 80% to 100%, of an internal circumference of the bearing tube. In other words, the mating shoulders and/or the mating introduction ramps can be configured having a circumference in the range of 20% to 100%, in particular in the range of 40% to 100%, and most particularly in the range of 80% to 100%, of the entire internal circumference of the bearing tube. The mating shoulders and/or the mating introduction ramps can thus be configured so as to run partially along the internal circumference of the bearing tube, having no interruption or one or a plurality of interruptions therebetween, or so as to run completely or continuously, respectively, along the internal circumference of the bearing tube. This not only permits a higher extraction force as a consequence of the larger area for the form-fit between the outer bearing sleeve and the bearing tube, but also a symmetrical external profile of the outer bearing sleeve, or of the outer bearing sleeve overall, respectively, that is thus simple to manufacture and connect to the bearing tube.

A partially, largely or completely encircling form-fitting interconnection between the outer bearing sleeve and the bearing tube can be provided. The internal profile can communicate in a form-fitting manner with the external profile here either partially, largely or completely encircling. This provides a more flexible alignment of the outer bearing sleeve, or of the elastomer bearing, respectively, when joining the latter to the bearing tube.

It can furthermore be provided that the introduction ramps start from the outward-projecting shoulders and run inward. Inward means towards a center, or towards a central axis, respectively, of the outer bearing sleeve. The central axis can be an axis of rotational symmetry of the external profile. The external profile can thus be configured so as to be rotationally symmetrical about the central axis of the outer bearing sleeve.

It can also be provided that straight portions start from the introduction ramps and run to the shoulders. One straight portion can thus in each case be disposed between an introduction ramp and a shoulder. Straight mating portions that communicate in a form-fitting manner with the straight portions can also start from the mating introduction ramps and run to the mating shoulders. This arrangement minimizes a notching effect that would otherwise be possible in the bearing tube.

It can moreover be provided that the bearing tube is configured so as to be rigid, in particular from a metal. In other words, the entire bearing tube including the internal profile thereof can thus be configured so as to be rigid. This facilitates the manufacturing because the bearing tube can be produced from a single material. For example, the bearing tube can be a sheet-metal strip which is shaped so as to form a tube. The internal profile can be stamped into one side of this sheet-metal strip. In the case of a metallic bearing tube, in particular of steel, other components can be simply welded to the bearing tube.

The outer bearing sleeve can be formed from a plastics material, in particular from an elastomer, so as to provide the flexible properties of the outer bearing sleeve.

It can furthermore be provided that the shoulders extend so as to be orthogonal to a central axis of the outer bearing sleeve. The mating shoulders can also extend so as to be orthogonal to a central axis of the bearing tube. The central axis of the bearing tube can also be an axis of rotational symmetry of the internal profile. The internal profile can thus be configured so as to be rotationally symmetrical about the central axis of the bearing tube. The extraction force is maximized as a result of a configuration of the shoulders and/or mating shoulders in this manner, wherein undercuts in the bearing tube are avoided to enable simple manufacturing of the bearing tube.

It can finally be provided that the smallest external diameter of the outer bearing sleeve is larger than the smallest internal diameter of the bearing tube. Accordingly, apart from the form-fit an interference fit, or a force-fit, respectively, is established between the outer bearing sleeve and the bearing tube. The outer bearing sleeve and the bearing tube here overlap in a region in which the outer bearing sleeve is compressed and exerts a force on the bearing tube. As a result, the extraction force for disassembling the outer bearing sleeve from the bearing tube is further increased.

A second disclosed embodiment provides a form-fitting interconnection of an outer bearing sleeve of an elastomer bearing of the disclosed system and a bearing tube of the disclosed system.

The outer bearing sleeve here in the press-fitting direction has been joined with the elastomer bearing to establish the form-fitting interconnection of the outer bearing sleeve and the bearing tube as a result. Of course, the form-fitting interconnection can also comprise the elastomer bearing, or the outer bearing sleeve conjointly with the elastomer bearing thereof can be connected to the bearing tube, respectively.

A third disclosed embodiment provides a transportation vehicle having a form-fitting interconnection. An elastomer bearing which comprises the outer bearing sleeve that is connected in a form-fitting manner to the bearing tube here is coupled to a first vehicle component of the transportation vehicle. The bearing tube here is coupled to a second vehicle component of the transportation vehicle.

The first vehicle component can be an electric motor of the transportation vehicle, for example, and the second vehicle component can be a sub-frame, for example. The transportation vehicle can correspondingly be an electrified transportation vehicle, for example, an electric transportation vehicle or a plug-in hybrid transportation vehicle. The sub-frame can be welded to the bearing tube. This results in a helpful use of a form-fitting interconnection having particularly high extraction forces, since the electric motor has a high weight and cannot be extracted from the bearing tube even in the operation of the transportation vehicle with the vibrations and loads arising in the latter.

Of course, the form-fitting interconnection can also be used for other vehicle components in a transportation vehicle in which an elastomer bearing is exposed to high stresses. Of course, the form-fitting interconnection can also be used in other technical applications outside transportation vehicles.

Elements of identical function and mode of action are in each case provided with the same reference signs in FIGS. 1 to 4.

FIG. 1 shows a system 1 of a flexible outer bearing sleeve 10, presently of a plastics material, in particular of an elastomer, and a rigid bearing tube 20, presently of metal. The outer bearing sleeve 10 here is shown in a frontal view, while the bearing tube 20 is shown in a cross-sectional view which exposes the interior of the bearing tube 20.

The outer bearing sleeve 10 has an external profile 14 which runs along an external circumference 15 of the outer bearing sleeve 10. The external profile 14 is configured so as to be symmetrical about a central axis 16 of the outer bearing sleeve 10. As a result, the external profile 14 is configured along the entire external circumference 14 on the outer bearing sleeve.

The bearing tube 20 in turn has an internal profile 24 that, for a form-fit, communicates with the external profile 14 of the outer bearing sleeve 10. The internal profile 24 runs along an internal circumference 25 of the bearing tube 20. The internal profile 24 is configured so as to be symmetrical about a central axis 26 of the bearing tube 20. As a result, the internal profile 24 is configured along the entire internal circumference 24 on the bearing tube 20.

The symmetrical construction, or the provision of the profiles 14, 24 about the circumferences 15, 25, respectively, enables an encircling form-fit between the outer bearing sleeve 10 and the bearing tube 20, as will be described hereunder. This enables a flexible alignment of the outer bearing sleeve 10 when joining with the bearing tube 20.

To establish a form-fitting interconnection 4 of the outer bearing sleeve 10 and the bearing tube 20 (see FIGS. 3, 4), the outer bearing sleeve 10, in particular as a component part of the elastomer bearing 5 thereof (see FIG. 4), or conjointly with the elastomer bearing 5 as an entity, is press-fitted in the bearing tube 20. This takes place in the press-fitting direction 2 shown in FIG. 1.

Counter to the press-fitting direction 2 there is the extraction direction 3. The extraction force to be applied in the extraction direction 3 for the firm fit to be released is a measure for the firm fit of the elastomer bearing 5 in the bearing tube 20.

Figure 2:
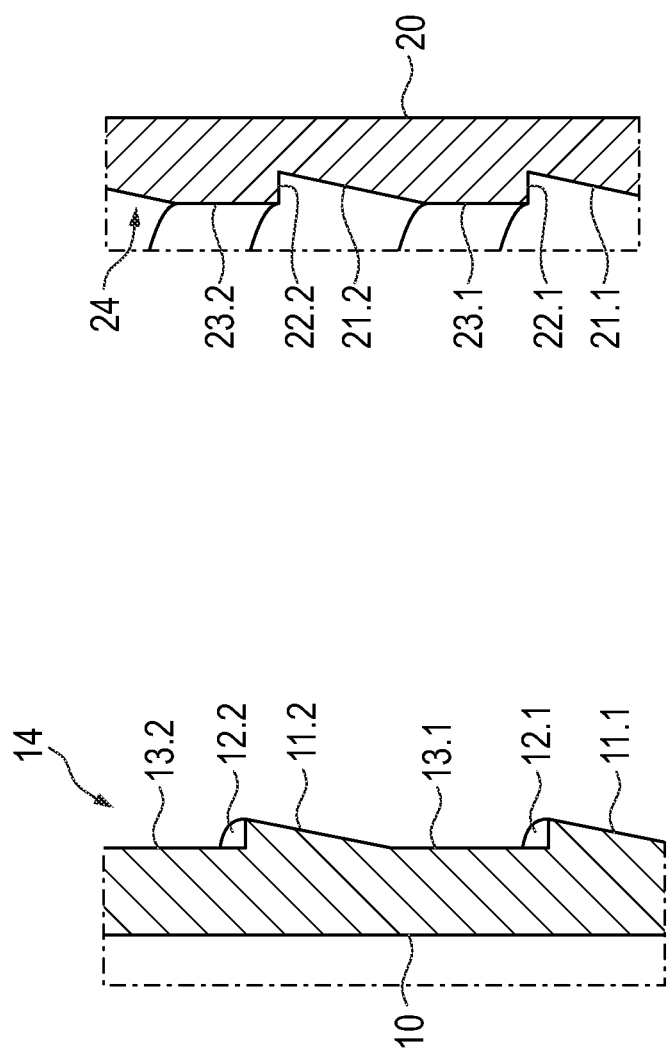
FIG. 2 shows a schematic view of the profiles of the outer bearing sleeve and of the bearing tube of the system of FIG. 1.
Figure 3:
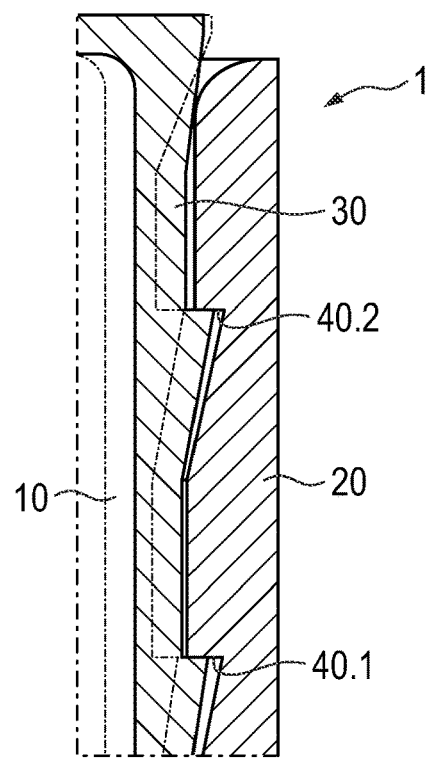
FIG. 3 shows a schematic view of the interference fit of the profiles of FIG. 2.

The form-fit in the form-fitting interconnection 4 is established by the external profile 14 and the internal profile 24 which mesh with one another, such as saw teeth. FIG. 2 shows a detailed fragment of each of the profiles 14, 24.

The fragment of the external profile 14 of the outer bearing sleeve 10 can be seen in the left part of FIG. 2. The external profile 14 is configured having outward-projecting shoulders 12.1, 12.2 and introduction ramps 11.1, 11.2 running inward in the press-fitting direction 2. The introduction ramps 11.1, 11.2 here in each case start from the shoulders 12.1, 12.2 and run in the press-fitting direction 2. A straight portion 13.1, 13.2 runs in each case between one of the shoulders 12.1, 12.2 and one of the introduction ramps 11.1, 11.2.

The fragment of the internal profile 24 of the bearing tube 20 can be seen in the right part of FIG. 2. The internal profile 24 is configured having outward-projecting mating shoulders 22.1, 22.2 and mating introduction ramps 21.1, 21.2 running inward in the press-fitting direction 2, the mating shoulders 22.1, 22.2 and mating introduction ramps 21.1, 21.2 for a form-fit with the shoulders 12.1, 12.2 and the introduction ramps 11.1, 11.2 being sized so as to correspond to the latter. The mating introduction ramps 11.1, 11.2 here likewise in each case start from the mating shoulders 22.1, 22.2 and run in the press-fitting direction 2. One straight mating portion 23.1, 23.2 that minimizes the notching effect in the bearing tube 20 runs in each case between one of the mating shoulders 22.1, 22.2 and one of the mating introduction ramps 21.1, 21.2.

The external circumference 15 along the central axis 16 of the outer bearing sleeve 10, in each case so as to be level with the elements in the form of the shoulders 12.1, 12.2, mating shoulders 22.1, 22.2, introduction ramps 11.1, 11.2 and mating introduction ramps 21.1, 21.2 that communicate in a form-fitting manner with one another, is sized so as to be larger than the internal circumference 25 of the bearing tube 20 along the central axis 26 of the bearing tube 20. As a result, the outer bearing sleeve 10 when press-fitting in the bearing tube 20 has to be compressed, and the overlap 30 shown in FIG. 3 arises, the overlap 30 having the resulting interference fit, or the resulting force-fit, respectively, between the outer bearing sleeve 10 and the bearing tube 20 along the profiles 14, 24. As a result, the required extraction force in the extraction direction 3 for disassembling the form-fitting interconnection 4 is severely increased.

It can be seen alongside that contact surfaces 40.1, 40.2 are established between the shoulders 12.1, 12.2 and the mating shoulders 22.1, 22.2, the contact surfaces 40.1, 40.2 in a movement of the outer bearing sleeve 10 in the extraction direction 3 leading to a counter-force which further increases the extraction force required for releasing the firm fit in the form-fitting interconnection 4.

Figure 4:
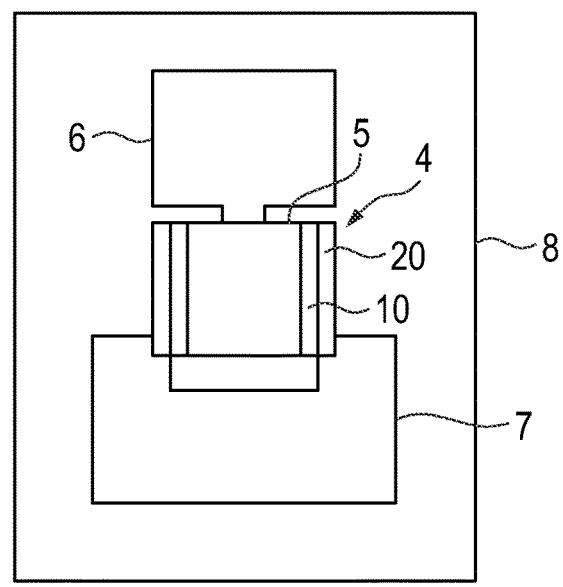
FIG. 4 shows a schematic view of a transportation vehicle according to an exemplary embodiment.

FIG. 4 in a purely schematic manner shows a transportation vehicle 8 having a form-fitting interconnection 4 according to the exemplary embodiments described above, having an outer bearing sleeve 10 of an elastomer bearing 5 and a bearing tube 20.

The outer bearing sleeve 10 having the internal components thereof is schematically indicated here, the internal components conjointly with the outer bearing sleeve 10 forming the elastomer bearing 5. These internal components which are disposed within the outer bearing sleeve 10 can be, for example, a core, in particular a rigid core, and, for example, an elastomer, for example, of polyamide, which is disposed between the core and the outer bearing sleeve 10.

The bearing tube 20 in the present case is fastened to a second vehicle component 7, for example, a sub-frame. The bearing tube 20 can be welded to the second vehicle component 7. Furthermore, the elastomer bearing 5 is fastened to a first vehicle component 6, for example, an electric motor.

LIST OF REFERENCE SIGNS

1 System
12 Press-fitting direction
3 Extraction direction
4 Form-fitting interconnection
5 Elastomer bearing
6 First vehicle component
7 Second vehicle component
8 Transportation vehicle
10 Outer bearing sleeve
11.1, 11.2 Introduction ramp
12.1, 12.2 Shoulder
13.1, 13.2 Straight portion
14 Profile, external profile
15 External circumference
16 Central axis of the outer bearing sleeve
20 Bearing tube
21.1, 21.2 Mating introduction ramp
22.1, 22.2 Mating shoulder
23.1, 23.2 Straight mating portion
24 Profile, internal profile
25 Internal circumference
26 Central axis of the bearing tube
30 Overlap
40.1, 40.2 Contact surface

The invention claimed is:

1. A system configured to prohibit disassembly of a form-fitting, bearing to bearing tube interconnection producing an extraction force there between, wherein the system consists of:
an elastomer bearing including a single layer, flexible outer bearing sleeve; and
a metal bearing tube,
wherein the single layer, flexible, outer bearing sleeve and the metal bearing tube are configured such that the single layer, flexible, outer bearing sleeve is press-fitted in the metal bearing tube along a press-fitting direction thereby establishing a direct form-fitting interconnection between the single layer, flexible, outer bearing sleeve and the metal bearing tube,
wherein the single layer, flexible, outer bearing sleeve includes an external profile having outward-projecting shoulders and introduction ramps running inward in the press-fitting direction along the entire external circumference of the single layer, flexible, outer bearing sleeve continuously, respectively, along the external circumference of the single layer, flexible, outer bearing sleeve,
wherein the metal bearing tube comprises an internal profile stamped along its entire circumference, wherein the internal profile form-fittingly communicates directly with the external profile of a contact surface of the single layer, flexible, outer bearing sleeve along its entire circumference,
wherein rigidity of at least the internal profile of the metal bearing tube causes the external profile of the contact surface of the single layer, flexible, outer bearing sleeve to deform in response to the press-fitting the single layer, flexible, outer bearing sleeve in the metal bearing tube so as to directly contact the metal bearing tube,
wherein the internal profile of the metal bearing tube remains rigidly undeformed in response to the press-fitting the single layer, flexible, outer bearing sleeve in the metal bearing tube while in direct contact with the metal bearing tube, and
wherein, by the press-fitting of the single layer, flexible, outer bearing sleeve in the metal bearing tube, the extraction force required for disassembly thereof is maximized as a result of the direct communication between the metal bearing tube and the single layer, flexible, outer bearing sleeve along the entire area of the form-fit between the single layer, flexible, outer bearing sleeve and the metal bearing tube.

2. An elastomer bearing configured to be included in a form-fitting, bearing to bearing tube interconnection that prohibits disassembly of the form-fitting, bearing to bearing tube interconnection producing an extraction force there between, wherein the elastomer bearing consists of:
a single layer, flexible outer bearing sleeve configured to communicate with a metal bearing tube by press-fitting the single layer, flexible, outer bearing sleeve in the metal bearing tube along a press-fitting direction thereby establishing a form-fitting interconnection between the single layer, flexible, outer bearing sleeve and the metal bearing tube,
wherein the single layer, flexible, outer bearing sleeve comprises an external profile having outward-projecting shoulders and introduction ramps running inward in the press-fitting direction along the entire external circumference of the single layer, flexible, outer bearing sleeve so as to run continuously, respectively, along the external circumference of the single layer, flexible, outer bearing sleeve,
wherein the metal bearing tube comprises an internal profile along its entire circumference that form-fittingly communicates directly with the external profile of a contact surface of the single layer, flexible, outer bearing sleeve along its entire circumference,
wherein rigidity of at least the internal profile of the metal bearing tube causes the contact surface external profile of the single layer, flexible, outer bearing sleeve to deform in response to the press-fitting the single layer, flexible, outer bearing sleeve in the metal bearing tube so as to directly contact the metal bearing tube,
wherein the internal profile of the metal bearing tube remains rigidly undeformed in response to the press-fitting the single layer, flexible, outer bearing sleeve in the metal bearing tube while in direct contact with the metal bearing tube, and
wherein, by the press-fitting of the single layer, flexible, outer bearing sleeve in the metal bearing tube, the extraction force required for disassembly thereof is maximized as a result of the direct communication between the metal bearing tube and the single layer, flexible, outer bearing sleeve along the entire area of the form-fit between the single layer, flexible, outer bearing sleeve and the metal bearing tube.

3. A transportation vehicle comprising the system of claim 1, wherein the single layer, flexible, outer bearing sleeve is coupled to a first vehicle component of the transportation vehicle, and the metal bearing tube is coupled to a second vehicle component of the transportation vehicle thereby providing a coupling of the first and second vehicle components via the elastomer bearing.

4. The system of claim 1, wherein the internal profile of the metal bearing tube comprises mating shoulders that directly communicate form-fittingly with the outward-projecting shoulders of the external profile, and mating introduction ramps that directly communicate form-fittingly with the introduction ramps of the single layer, flexible, outer bearing sleeve and run in the press-fitting direction so as to provide direction contact between the single layer, flexible, outer bearing sleeve and the metal bearing tube along the entire contact surface of the mating shoulders and the mating introduction ramps.

5. The system of claim 1, wherein the introduction ramps of the single layer, flexible, outer bearing sleeve start from the outward-projecting shoulders of the single layer, flexible, outer bearing sleeve and run inward.

6. The system of claim 1, wherein straight portions start from the introduction ramps and run to the shoulders of the single layer, flexible, outer bearing sleeve.

7. The system of claim 1, wherein the entirety of the metal bearing tube is rigid.

8. The system of claim 1, wherein the shoulders of the single layer, flexible, outer bearing sleeve extend orthogonally to a central axis of the single layer, flexible, outer bearing sleeve.

* * * * *